(12) United States Patent
Hwang et al.

(10) Patent No.: US 7,036,697 B2
(45) Date of Patent: May 2, 2006

(54) APPARATUS FOR COMPACTLY STORING TOOLS AND ACCESSORIES TOGETHER WITH A SPARE WHEEL, AND TOOL KIT INCORPORATING SAME

(75) Inventors: John Hwang, Columbus, OH (US); Matt Stechschulte, Hilliard, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 237 days.

(21) Appl. No.: 10/644,369

(22) Filed: Aug. 20, 2003

(65) Prior Publication Data

US 2005/0040191 A1   Feb. 24, 2005

(51) Int. Cl.
*B62D 43/00* (2006.01)

(52) U.S. Cl. ............................... 224/42.14; 224/42.12; 206/373

(58) Field of Classification Search ............ 224/42.12, 224/42.14; 206/234, 373
See application file for complete search history.

(56) References Cited

U.S. PATENT DOCUMENTS

| | | | |
|---|---|---|---|
| 1,008,680 A | | 11/1911 | Temple |
| 1,589,770 A | * | 6/1926 | Trigg ...................... 224/42.14 |
| 2,699,865 A | * | 1/1955 | Bowen ....................... 206/373 |
| 3,377,736 A | * | 4/1968 | Woolworth ................. 43/57.1 |
| 3,513,969 A | * | 5/1970 | Roff .......................... 206/577 |
| 4,283,083 A | | 8/1981 | Johnson |
| 4,498,614 A | * | 2/1985 | Guarr ...................... 224/42.13 |
| 4,830,241 A | * | 5/1989 | Ulmer et al. ............... 224/42.2 |
| 4,836,374 A | * | 6/1989 | Hutchins et al. ............ 206/373 |
| 4,917,279 A | * | 4/1990 | Brow et al. .............. 224/42.14 |
| 5,005,710 A | * | 4/1991 | Hofer ........................ 211/70.6 |
| 5,118,017 A | | 6/1992 | Buck |
| 5,316,178 A | * | 5/1994 | Garber, Jr. ..................... 222/3 |
| 5,429,285 A | * | 7/1995 | Kim ........................ 224/42.14 |
| 5,447,110 A | | 9/1995 | Brown |
| 5,941,432 A | * | 8/1999 | Spencer et al. .......... 224/42.13 |
| 6,026,999 A | * | 2/2000 | Wakefield ................ 224/42.12 |
| 6,102,204 A | * | 8/2000 | Castleberry ................. 206/423 |
| 6,216,858 B1 | * | 4/2001 | Chiu .......................... 206/234 |
| 6,230,949 B1 | * | 5/2001 | O'Connell et al. ......... 224/557 |
| 6,336,671 B1 | * | 1/2002 | Leonardi ................... 296/37.3 |
| 6,467,829 B1 | | 10/2002 | Kaluszka et al. |
| 2002/0074254 A1 | * | 6/2002 | Huang ....................... 206/373 |

FOREIGN PATENT DOCUMENTS

JP   2001146137 A   *   5/2001

* cited by examiner

*Primary Examiner*—Nathan J. Newhouse
*Assistant Examiner*—Justin M Larson
(74) *Attorney, Agent, or Firm*—Carrier, Blackman & Associates, P.C.; William D. Blackman; Joseph P. Carrier

(57) ABSTRACT

An apparatus for holding and storing tools in a vehicle, including a storage body shaped to fit inside the hub of a spare wheel. The storage body has a jack storage space for securely holding a vehicle raising jack, a lug wrench-receiving space for securely holding a lug wrench and a hollow storage well for holding and storing one or more various user-selected tools or accessories. The storage well has a volume approximately as large as said jack storage space. The storage well may be substantially crescent shaped in cross section and extends substantially the full depth of the storage body for thereby providing a relatively large storage space in a otherwise restricted area of a vehicle trunk. Optionally, tools may be added to the storage body, and fitted into the appropriate storage spaces therein, to form a compact tool kit and storage receptacle for a vehicle.

22 Claims, 4 Drawing Sheets

APPARATUS FOR COMPACTLY STORING TOOLS AND ACCESSORIES TOGETHER WITH A SPARE WHEEL, AND TOOL KIT INCORPORATING SAME

BACKGROUND OF THE INVENTION

1. Field of the Invention

The present invention relates to a storage apparatus for securely storing tools and/or accessories together with of a spare wheel of a vehicle, and to a tool kit incorporating the storage apparatus. More particularly, the present invention relates to such a storage apparatus and tool kit which compactly fits in the hub of the spare wheel and also includes a relatively large storage well formed therein to selectively receive and store various user-selected tools and/or accessories in addition to the tool kit.

2. Description of the Background Art

Previously, most vehicles on the road were equipped with hubcaps, and it formerly became standard practice to temporarily store lug nuts in a hubcap, which had been removed from a wheel, while the wheel was being changed.

Many of the vehicles on the road today are equipped with alloy wheels, and often, alloy wheels do not have hubcaps. In the event of a wheel failure, necessitating a roadside wheel change by the driver of the vehicle, in the absence of hubcaps, there is some risk that if a driver sets lug nuts down on the roadside, they may become lost or misplaced. A substitute storage receptacle is needed to temporarily store lug nuts removed from the vehicle during a wheel changing procedure.

A number of different devices are known for storing tools, such as wheel changing tools, in or on vehicles.

It has been known to store wheel changing tools inside of the hub of a vehicle spare wheel. For example, 1996–2000 Honda Civic hatchbacks were factory-equipped with a plastic foam block, which fit into a central recess of the spare wheel hub, as shown in FIG. 5 of the present application. This foam block 1 has a large deep recess formed in a central portion thereof which is shaped to receive and store a scissors-type vehicle raising jack 2, and a pair of shallow recesses formed on opposite sides of the central recess and shaped to securely receive a lug wrench 3 and a jack bar 4 therein, respectively. However, this block is limited to storage of the jack, lug wrench and jack bar.

Examples of some issued U.S. patents relating to vehicular tool storage follow.

Temple, U.S. Pat. No. 1,008,680, issued in 1911 and entitled "Combined Wheel Support and Tool Case" discloses a tool case which is configured to fit inside the hub of a spare wheel, mounted on the outside of a vehicle. The tool case of Temple includes a hinged casing, with a plurality of leather loops attached to the interior of the casing, for receiving and holding tools.

Buck, U.S. Pat. No. 5,118,017, issued Jun. 2, 1992 and entitle "Storage Container", discloses a hollow disc-shaped storage receptacle which is removably mountable on the outside of a spare wheel. The storage container of Buck is defined by a base and a removably mountable cover, which fits over the base. When the storage container of Buck is mounted on the wheel, the base and the cover are not separable.

Kim, U.S. Pat. No. 5,429,285, issued Jul. 4, 1995 and entitled "Receptacle Adapted For Car", discloses a receptacle, made in several pieces, for installation within the spare wheel of a vehicle. The receptacle is shaped like a bowl, having a tapered circular sidewall and a flat bottom. The shape of the container allows the receptacle to fit inside the rim or hub of the spare wheel. A cap fits on top of the container so that the contents do not fall out. The bowl of Kim is divided into layers. The bottom of the disclosed receptacle is hollow, while a tray for suspending tools fits on top, with a road sign or hazard sign contained in the cap of the device.

Wakefield, U.S. Pat. No. 6,026,999, issued Feb. 22, 2000 and entitled "Concentric Tool Box For Motorized Conveyances", discloses another design for a hollow disc-shaped tool storage box for vehicular emergencies. The tool box of Wakefield is adapted to be used with vehicles having the spare wheel stored under the vehicle, and is adapted to be suspended underneath a vehicle frame, using the factory installed winch system for the spare wheel. The Wakefield tool box includes two half-cylindrical containers hinged together on one side, each container having its own lid. One side of Wakefield's tool box contains a tool tray for securing specific tools.

Kaluszka et al, U.S. Pat. No. 6,467,829, issued Oct. 22, 2002 and entitled "Tool Retaining Vehicle Spare Wheel Storage System", discloses a spare wheel storage system in which tools are frictionally retained on the underside of a flat wheel cover. The underside of the flat wheel cover includes a shaped recess for receiving the spare wheel, allowing the lid to rest upon the spare wheel. The underside of the lid further includes at least one tool-retaining recess for retaining a tool in a snap-fit relationship.

Although the known devices have utility for their intended purposes, a need still exists in the art for an improved storage receptacle for securely holding and arranging tools and/or other accessories inside of a spare wheel in a vehicle in a compact fashion. In particular, there is a need for an improved tool storage apparatus, of the type described, which also includes an empty storage area, for temporarily receiving and storing various user-selected accessories, such as lug nuts and hand tools.

It would be advantageous if a one-piece tool storage member is provided with tool-shaped openings formed therein to nestingly receive specific vehicle-related tools, including tools used in changing a wheel and tools used in towing a vehicle, and was also provided with a relatively large supplemental recess formed therein, to store various user-selected accessories if desired.

SUMMARY OF THE INVENTION

In a first aspect hereof, the present invention provides an apparatus for holding and storing tools for use in a vehicle, comprising: a storage body shaped and dimensioned to fit with a spare wheel of a vehicle, the storage body having formed therein a jack storage space to securely receive a vehicle raising jack, a lug wrench-receiving space to securely receive a lug wrench, and a hollow storage well for holding and storing one or more various user-selected accessories; and the storage well having a volume approximately as large as said jack storage space.

The storage body may be shaped to fit securely in a hub of the spare wheel the storage well may be substantially crescent-shaped in cross section, and the storage body may be formed as an integral, unitary member, with said jack storage space, said lug wrench receiving space and said storage well formed as recesses in said unitary member.

The storage body may be molded as a hollow plastic body, or alternatively, as a foamed plastic body. The storage well may extend substantially the full depth of the storage body. Additionally, the lug wrench-receiving space may be defined in an upper surface of the storage body, while the jack storage space and the storage well extend from the upper surface much deeper into said storage body than said lug wrench-receiving space, and may be disposed on opposite sides of the lug wrench-receiving space.

Still further, the storage body may have with multiple additional storage spaces defined therein which are shaped to securely receive other tools useful in a vehicle, such as a tow hook, a tow hook extension, a flat tire holder extension, etc.

In another aspect of the invention, tools may be added to the storage body and fitted into the appropriate receptacles therein, to form a tool kit for a vehicle.

Accordingly, it is an object of the present invention to provide an apparatus for conveniently and compactly storing tools together with the spare wheel in a vehicle, and also including a relatively large storage well that may be selectively used by a driver to store or hold other tools or accessories desired by the driver.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF EMBODIMENTS OF THE INVENTION

Figure 1:
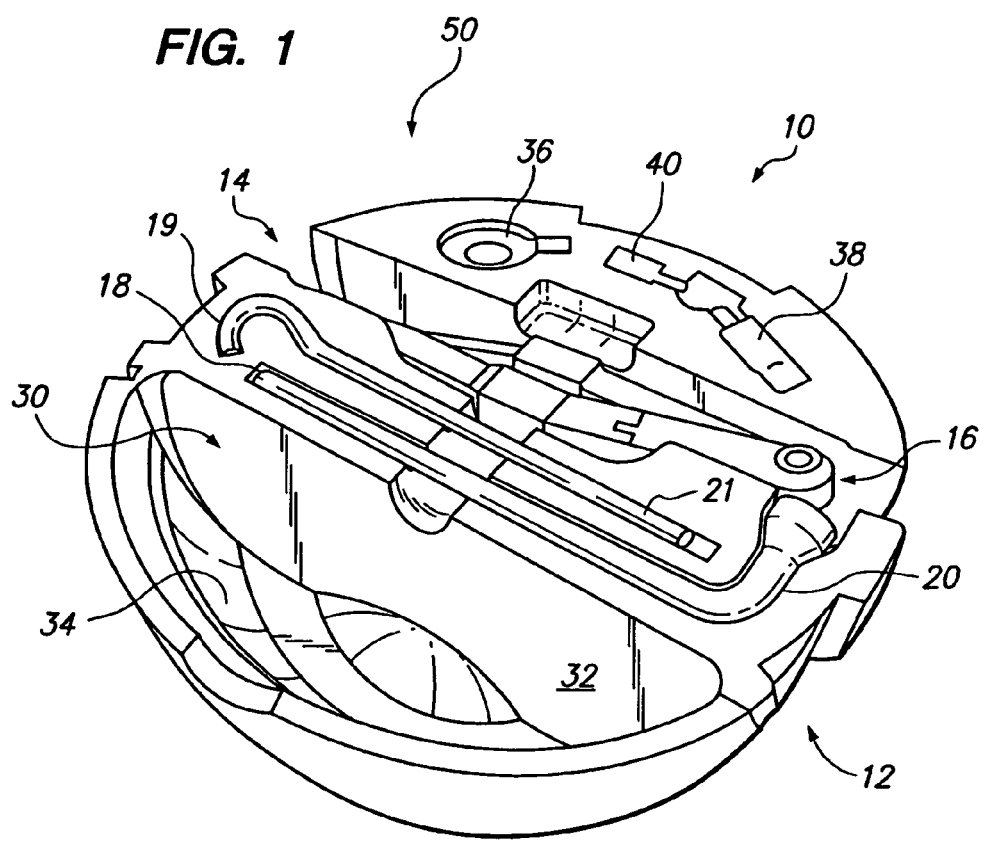
FIG. 1 is a first perspective view of an illustrative embodiment of a tool storage apparatus according to the invention, shown with a plurality of wheel-changing hand tools stored therein.
Figure 2:
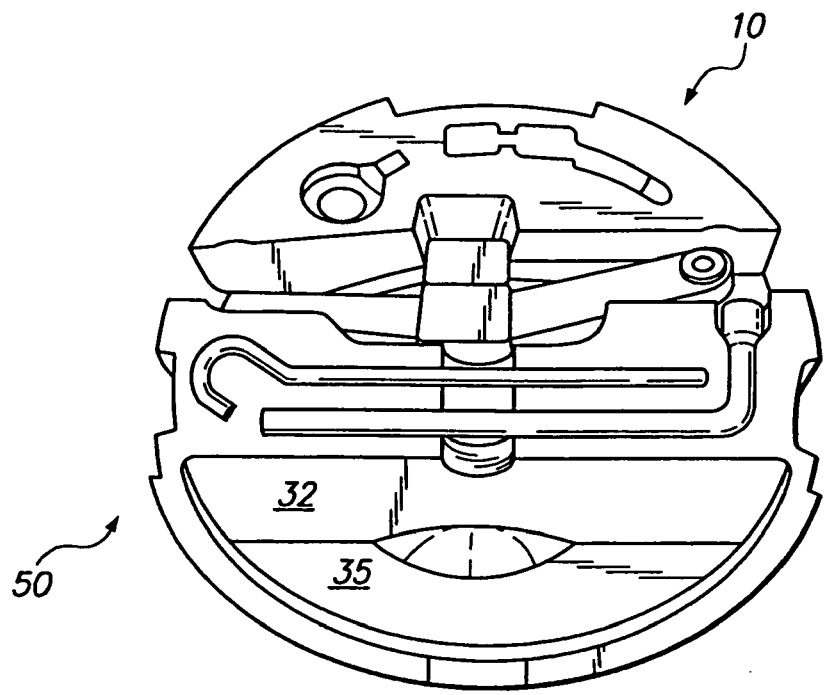
FIG. 2 is a second perspective view of the apparatus of FIG. 1, shown from an overhead viewpoint.
Figure 3:
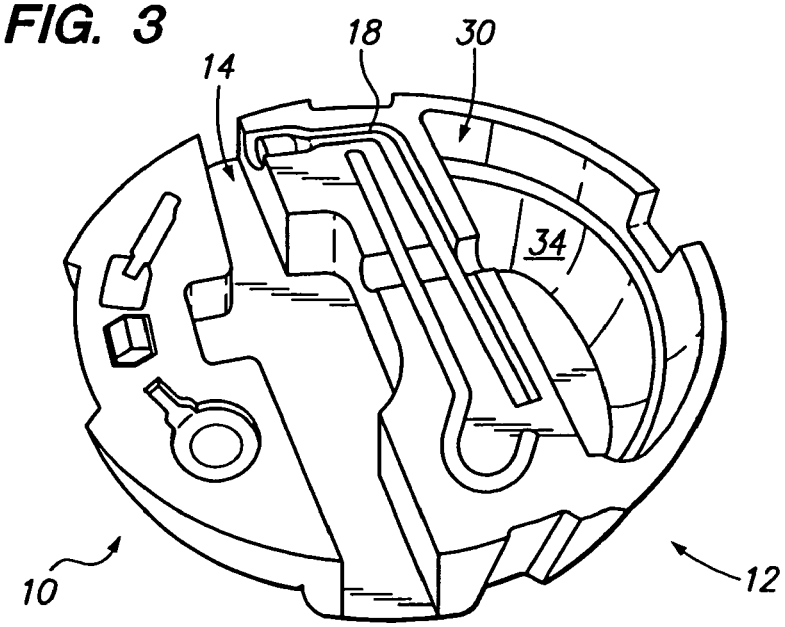
FIG. 3 is a third perspective view of the apparatus of FIGS. 1–2, with the position of the apparatus substantially reversed 180 degrees from that shown in FIG. 1, and with the jack removed therefrom for illustrative purposes.
Figure 4:
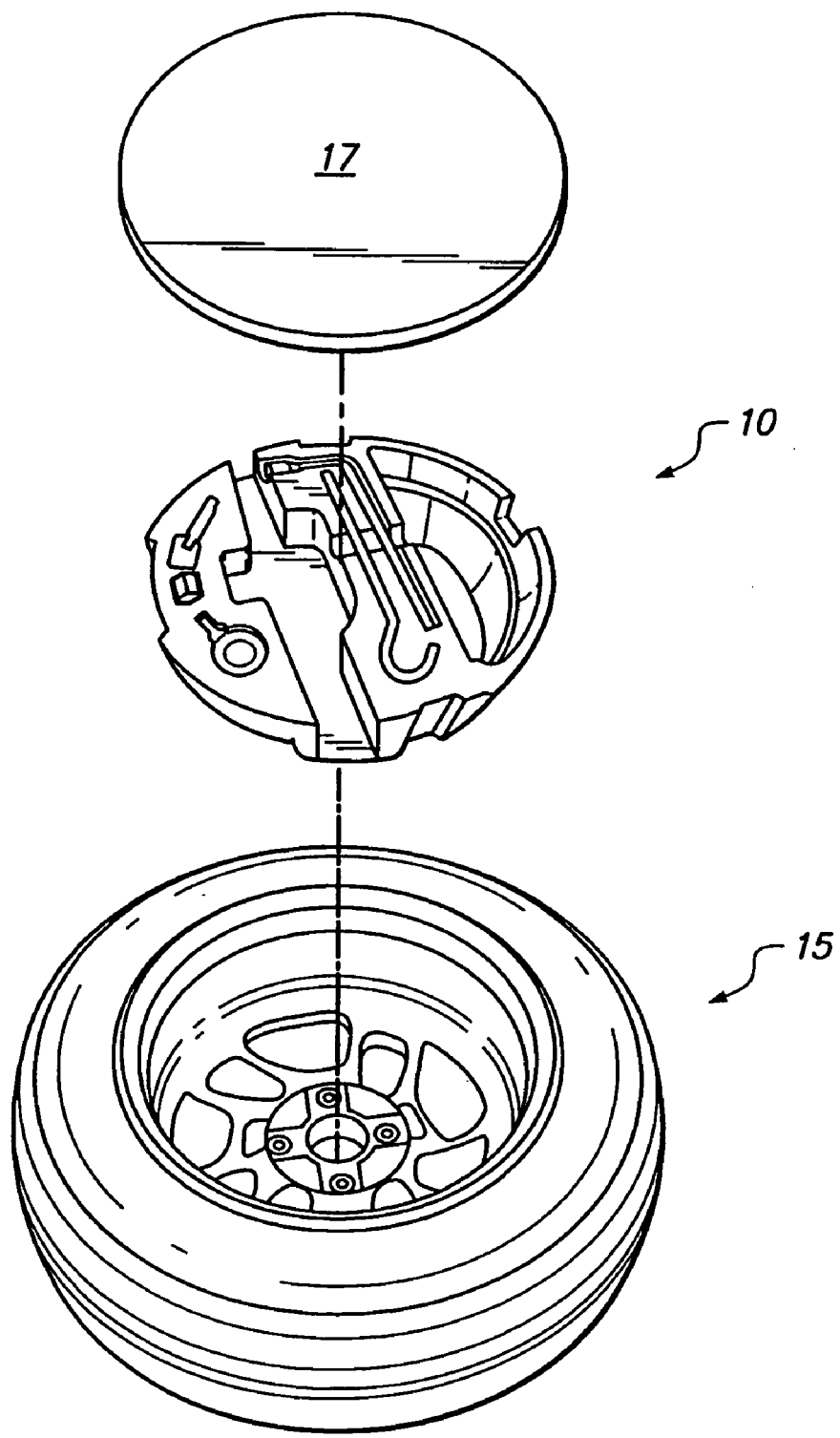
FIG. 4 is a perspective view of a vehicle spare wheel, also showing the apparatus of FIG. 3 and an optional cover plate.
Figure 5:
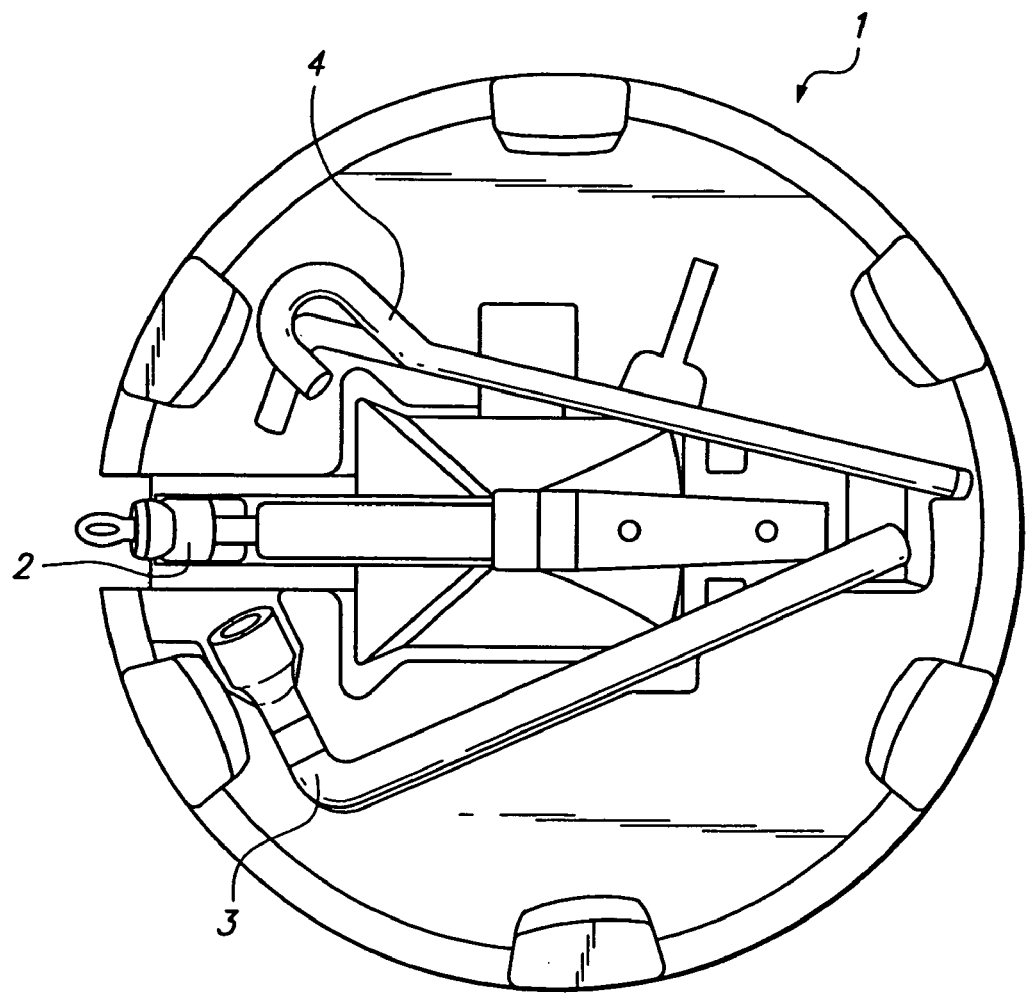
FIG. 5 is a plan view of prior storage body formed as a plastic foam block which stores spare wheel changing tools for a vehicle and fits in the hub of the spare wheel.

Referring now to FIGS. 1–4 of the drawings, a storage apparatus, according to an illustrative embodiment of the invention, is shown generally at 10. The apparatus 10 includes a storage body 12 shaped and dimensioned to fit inside the rim or hub of a spare wheel 15 of a vehicle, as shown in FIG. 4. Optionally, the apparatus may also include a cover 17 which fits over the storage body 12 in the spare wheel 15, to retain a plurality of tools in place therein and/or to generally conceal the spare wheel in the trunk of the vehicle. Although the cover 17 is depicted as round, it will be understood that the cover may be provided in any appropriate shape, e.g., it could be shaped to cover the entire bottom surface of the vehicle trunk, with the spare wheel enclosed between the bottom surface on the cover.

The storage body 12 may be made as a single or unitary integral member of appropriate material(s) such molded hollow plastic, or foamed plastic. Such plastic construction is desirably light weight and minimizes or eliminates any vibrations or rattling of tools and other accessories stored therewith during vehicle travel.

The storage body 12 has a hollow, i.e., a recessed jack storage space 14 formed therein to nestingly receive a jack 16, such as a scissors jack as shown, a hydraulic bottle-type jack, etc. As seen best in FIG. 3, the jack storage space 14 is dimensioned to correspond to the shape of the jack 16, when the jack is in a lowered and compact configuration, and the jack storage space extends from one side edge of the storage body to an opposite side edge thereof, as shown.

The storage body 12 also has a lug wrench receiving groove 18 formed therein, for receiving a lug wrench 20. The lug wrench receiving groove 18 may include, for example, a substantially 90 degree bend, to correspond to the bend in the neck of a conventional lug wrench 20. In the depicted embodiment, the storage body 12 also has a jack bar-receiving groove 19 formed therein, for receiving an extension 21. The grooves 18, 19 are relatively shallow recesses formed in the upper surface of the storage body 12, unlike the jack storage space 14 discussed above or a storage well 30 discussed below, which extend deeply into the storage body.

The storage body 12 may also have a plurality of additional hollow storage spaces or recesses formed therein, as shown, for receiving additional automotive related tools, such as a tow hook 36, a tow hook extension 38, a flat tire holder extension 40, etc. as depicted. As shown, the grooves 18, 19 and the other tool storage spaces may be provided on opposite sides of the jack storage space 14.

According to an important aspect of the invention, the storage body 12 also has a relatively large, deep and hollow storage well 30 formed therein for holding and/or storing one or more user-selected accessories and/or tools. The storage well 30 may be shaped as a flat-sided crescent in cross section and extend substantially the full depth of the storage body, as shown. In the depicted embodiment, the storage body 12 includes a substantially flat inner side wall 32 and a curved inner side wall 34, which cooperate with a floor 35 to form the storage well 30. The storage well 30 has a volume approximately as large or larger than the jack storage space 14, and much larger than the grooves 18, 19. This desirably allows for a relatively large, variable use storage area that has not previously existed in a tight space in a vehicle, i.e., in the hub of the spare wheel.

The storage well 30 may, for example, be used to hold additional tools, such as screwdrivers, pliers, etc. (not shown) that the vehicle owner chooses to place therein, lug nuts for a wheel being changed. Again due to construction of the storage body from hollow plastic, plastic foam or the like, any rattling or vibration caused by tools and accessories in the well 30 during vehicle travel will be kept to a minimum. As it will be understood from FIGS. 2 and 3, a top surface of the storage body defines a substantially flat plane including edge portions disposed at the same level as medial portions of the storage body; and upper tool surfaces, when stored within the storage body, are equal with or below the flat plane of the top surface.

In the event of a flat wheel, necessitating a roadside wheel change, the storage body 12 may be removed from the car, and placed on the ground or other appropriate surface, and the storage well 30 thereof may be used to temporarily store lug nuts and/or appropriate tools during the wheel change. This allows a user to easily retrieve the lug nuts and tools when needed.

In another aspect of the invention, again, other tools may be added to the storage body and fitted into the appropriate storage spaces therein, to form a tool kit 50 for a vehicle.

Examples of tools which may be included in the kit 50 include the aforementioned jack 16, lug wrench 20, jack bar 21, tow hook 36, tow hook extension 38 and flat tire holder extension 40.

Although the invention has been described herein with respect to a limited number of present embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. An apparatus for holding and storing tools for use in a vehicle, comprising:
   a storage body shaped and dimensioned to fit within a spare wheel of a vehicle,
   said storage body having formed therein a jack storage space to securely receive a vehicle raising jack, a lug wrench-receiving space to securely receive a lug wrench, and a hollow storage well for holding and storing one or more various user-selected accessories; and
   said storage well having a volume approximately as large as said jack storage space;
   wherein a top surface of the storage body defines a substantially flat plane, said top surface including an outermost annular edge of the storage body and medial portions of the storage body; and
   wherein upper tool surfaces are equal with or below the flat plane in a stored configuration of said tools wherein the jack storage space extends from a first portion of the outermost annular edge to a second portion of the outermost annular edge, said first and second portions being located on opposite sides of the storage body.

2. The apparatus of claim 1, wherein the storage body is shaped to fit securely in a hub of the spare wheel, wherein the storage body is configured and dimensioned with a sufficient depth to allow the jack storage space to nestingly receive a scissors jack or a hydraulic bottle-type jack therein, in a compact configuration of the jack.

3. The apparatus of claim 1, wherein the storage well is substantially crescent-shaped in cross section.

4. The apparatus of claim 1, wherein the storage body is an integral, unitary member, and said jack storage space, said lug wrench receiving space and said storage well are formed as recesses in said unitary member.

5. The apparatus of claim 1, wherein the storage body is formed from foamed plastic.

6. The apparatus of claim 1, wherein a lower portion of the storage body is shaped to fit securely in a hub of the spare wheel.

7. The apparatus of claim 1, wherein said storage well extends substantially the full depth of the storage body.

8. The apparatus of claim 1, wherein said lug wrench-receiving space is defined in an upper surface of said storage body, and said jack storage space and said storage well extend from the upper surface deeper into said storage body than said lug wrench-receiving space.

9. The apparatus of claim 1, wherein said storage body has multiple additional storage spaces defined therein and shaped to securely receive other tools.

10. The apparatus of claim 1, wherein said lug wrench-receiving space is defined in an upper surface of said storage body, and said jack storage space and said storage well extend into said storage body on opposite sides of said lug wrench-receiving space.

11. A tool kit for a vehicle, comprising:
    a storage body shaped and dimensioned to fit within a spare wheel of a vehicle,
    said storage body having formed therein a recessed jack storage space to securely receive a vehicle raising jack, a lug wrench-receiving space to securely receive a lug wrench, and a hollow storage well for holding and storing one or more various user-selected accessories;
    a vehicle raising jack which securely fits in the jack storage space;
    a lug wrench which securely fits in said lug wrench-receiving space; and
    said storage well having a volume approximately as large as said jack storage space; and
    wherein the jack storage space extends from a first portion of the outermost annular edge to a second portion of the outermost annular edge, said first and second portions being located on opposite sides of the storage body.

12. The tool kit of claim 11, wherein the storage body is shaped to fit securely in a hub of the spare wheel, wherein the storage body is configured and dimensioned with a sufficient depth to allow the jack storage space to nestingly receive a scissors jack or a hydraulic bottle-type jack therein, in a compact configuration of the jack.

13. The tool kit of claim 11, wherein the storage well is substantially crescent-shaped in cross section.

14. The tool kit of claim 11, wherein the storage body is an integral unitary member.

15. The tool kit of claim 11, wherein the storage body is formed from foamed plastic.

16. The tool kit of claim 11, wherein said storage well extends substantially the full depth of the storage body.

17. The tool kit of claim 11, wherein said lug wrench-receiving space is defined in an upper surface of said storage body, and said jack storage space and said storage well extend from the upper surface deeper into said storage body than said lug wrench-receiving space.

18. The tool kit of claim 11, wherein said storage body has multiple additional storage spaces defined therein and shaped to securely receive other tools.

19. The tool kit of claim 11, wherein a lower portion of the storage body is shaped to fit securely in a hub of the spare wheel.

20. The tool kit of claim 11, wherein said lug wrench-receiving space is defined in an upper surface of said storage body, and said jack storage space and said storage well extend into said storage body on opposite sides of said lug wrench-receiving space.

21. The apparatus of claim 1, wherein the storage body is separable from the spare wheel by hand without requiring use of a tool.

22. A tool kit for holding and storing tools in a vehicle, comprising:
    a storage body shaped and dimensioned to fit within a spare wheel of a vehicle;
    said storage body having formed therein a recessed jack storage space to securely receive a vehicle raising jack, a lug wrench-receiving space to securely receive a lug wrench, and a hollow storage well for holding and storing one or more various user-selected accessories;
    the jack storage space extending from a first portion of the outermost annular edge to a second portion of the outermost annular edge, said first and second portions being located on opposite sides of the storage body;
    a vehicle raising jack which securely fits in the jack storage space;
    a lug wrench which securely fits in said lug wrench-receiving space; and said storage well having a volume approximately as large as said jack storage space;

wherein a top surface of the storage body defines a substantially flat plane, said top surface including edges and medial portions of the storage body;

wherein upper tool surfaces are equal with or below the flat plane in a stored configuration of said tools; and wherein the storage body is separable from the spare wheel by hand without requiring use of a tool.

* * * * *